US012705053B2

(12) United States Patent
Martinez Vicente et al.

(10) Patent No.: US 12,705,053 B2
(45) Date of Patent: Aug. 11, 2026

(54) PREDICATION TECHNIQUES

(71) Applicant: Arm Limited, Cambridge (GB)

(72) Inventors: Alejandro Martinez Vicente, Cambridge (GB); Nigel John Stephens, Cambridge (GR); Jelena Milanovic, Biot (FR)

(73) Assignee: Arm Limited, Cambridge (GB)

( * ) Notice: Subject to any disclaimer, the term of this patent is extended or adjusted under 35 U.S.C. 154(b) by 210 days.

(21) Appl. No.: 18/579,804

(22) PCT Filed: Jun. 22, 2022

(86) PCT No.: PCT/GB2022/051586

§ 371 (c)(1),
(2) Date: Jan. 16, 2024

(87) PCT Pub. No.: WO2023/002147

PCT Pub. Date: Jan. 26, 2023

(65) Prior Publication Data

US 2024/0329996 A1 Oct. 3, 2024

(30) Foreign Application Priority Data

Jul. 21, 2021 (GB) ...................................... 2110500

(51) Int. Cl.
*G06F 9/30* (2018.01)

(52) U.S. Cl.
CPC ...... *G06F 9/30036* (2013.01); *G06F 9/30038* (2023.08); *G06F 9/3016* (2013.01)

(58) Field of Classification Search
CPC . G06F 9/30036; G06F 9/3016; G06F 9/30038
See application file for complete search history.

(56) References Cited

U.S. PATENT DOCUMENTS

2005/0027968 A1* 2/2005 Rupley, II ........... G06F 9/30036
712/E9.05
2008/0016320 A1 1/2008 Menon et al.
2008/0046683 A1* 2/2008 Codrescu ............ G06F 9/30094
712/7

(Continued)

FOREIGN PATENT DOCUMENTS

| | | |
|---|---|---|
| TW | 201337743 | 9/2013 |
| TW | 201346731 | 11/2013 |
| TW | 201346746 | 11/2013 |

OTHER PUBLICATIONS

Combined Search and Examination Report for GB2110500.2, dated Apr. 19, 2022.

(Continued)

*Primary Examiner* — Zachary K Huson
(74) *Attorney, Agent, or Firm* — NIXON & VANDERHYE P.C.

(57) ABSTRACT

Apparatuses, methods and programs are disclosed relating to the predication of multiple vectors in vector processing. An encoding of predicate information is disclosed which comprises an element size and an element count, wherein the predicate information comprises a multiplicity of consecutive identical predication indicators given by the element count, each predication indicator corresponding to the element size.

20 Claims, 9 Drawing Sheets

(56) References Cited

U.S. PATENT DOCUMENTS

Figure 1:
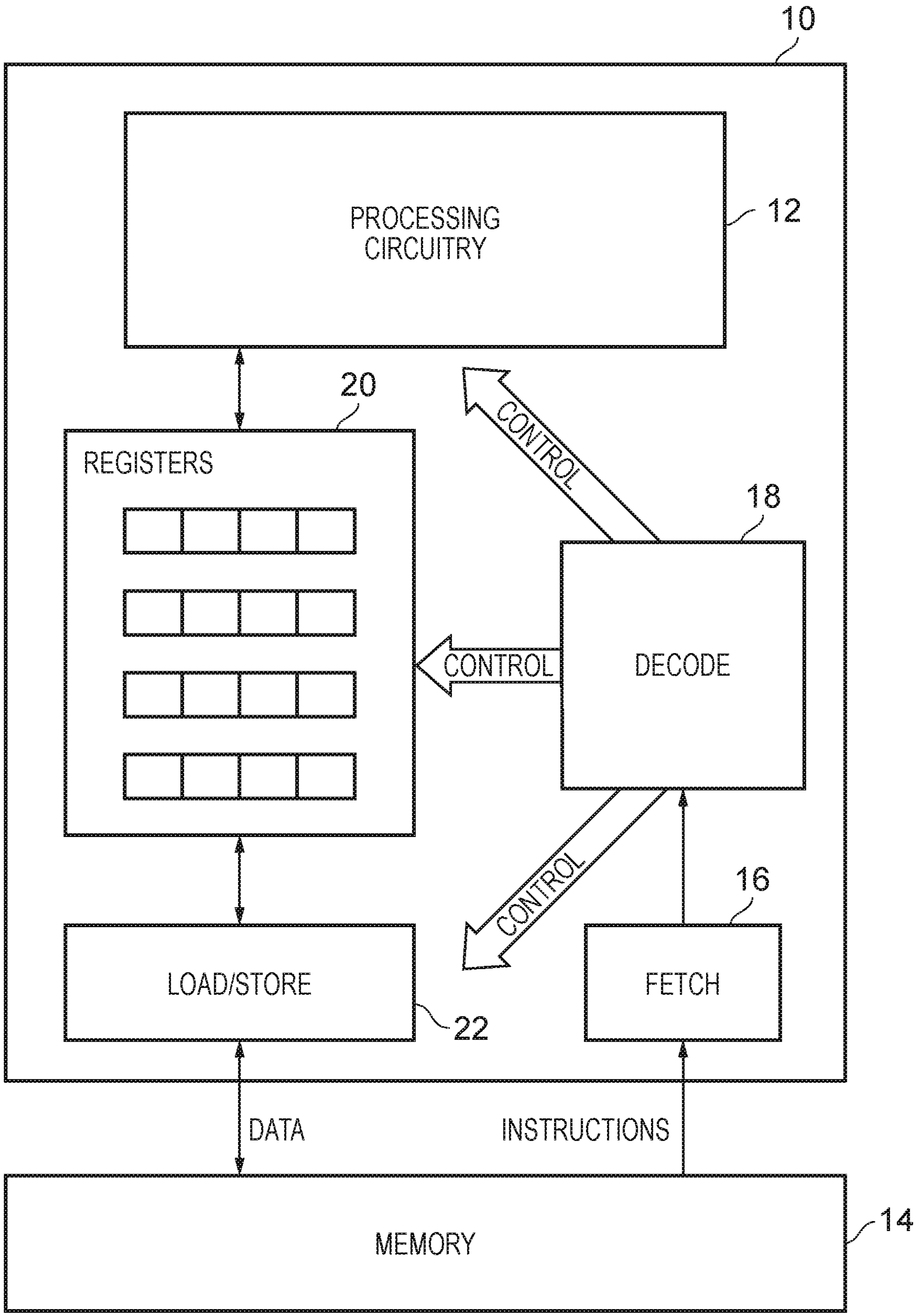

| | | | | |
|---|---|---|---|---|
| 2015/0089189 | A1* | 3/2015 | Gonion | G06F 9/30076 712/4 |
| 2015/0089191 | A1 | 3/2015 | Gonion | |
| 2019/0310847 | A1* | 10/2019 | Grocutt | G06F 9/30036 |
| 2021/0149820 | A1 | 5/2021 | Zbiciak et al. | |

OTHER PUBLICATIONS

International Search report and the written opinion for International Application No. PCT/GB2022/051586, dated Aug. 16, 2022.

Office Action for TW Application No. 111126953 issued Jan. 28, 2026 and English translation, 19 pages.

English translation of Office Action for JP Application No. 2024-502040 issued Apr. 3, 2026, 2 pages.

* cited by examiner

151 OPCODE (PREDICATE CONVERSION)
152 DESTINATION PREDICATE REGISTER
153 SIZE
154 SOURCE PREDICATE REGISTER
155 SELECTION (0-3)
150
160 PREDICATE DATA VALUE
161 PREDICATE DECODING
162 EXPANDED MASK PREDICATE
3 2 1 0
163 SELECTION
164 DESTINATION

PREDICATION TECHNIQUES

The present techniques relate to data processing. In particular, the relate to vector processing and the use of predicates to control that vector processing.

A data processing apparatuses may be provided with processing circuitry to perform vector processing operations. Vector processing operations may involve parallel operations being performed on the respective elements of vectors held in vector registers. Predication of a vector processing operation with respect to a vector comprises controlling which elements of that vector are subjected to the vector processing operation.

At least some examples described herein provide an apparatus comprising:

decode circuitry to decode instructions; and processing circuitry to apply vector processing operations specified by the instructions to input data vectors, wherein the decode circuitry is responsive to a vector processing instruction specifying:

a vector processing operation;

one or more source operands; and a source predicate register, to generate control signals which cause the processing circuitry to perform the vector processing operation with respect to the source operand, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity of consecutive identical predication indicators, each predication indicator corresponding to the element size.

At least some examples described herein provide a method of data processing comprising:

decoding instructions; and controlling processing circuitry to apply vector processing operations specified by the instructions to input data vectors, wherein the decoding comprises, in response to a vector processing instruction specifying:

a vector processing operation;

one or more source operands; and a source predicate register, generating control signals which cause the processing circuitry to perform the vector processing operation with respect to the source operand, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity consecutive identical predication indicators, each predication indicator corresponding to the element size.

At least some examples described herein provide a computer program for controlling a host processing apparatus to provide an instruction execution environment comprising:

decode logic to decode instructions; and processing logic to apply vector processing operations specified by the instructions to input data vectors, wherein the decode logic is responsive to a vector processing instruction specifying:

a vector processing operation;

one or more source operands; and a source predicate register, to generate control signals which cause the processing logic to perform the vector processing operation with respect to source operands, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity of consecutive identical predication indicators, each predication indicator corresponding to the element size.

Figure 2A:
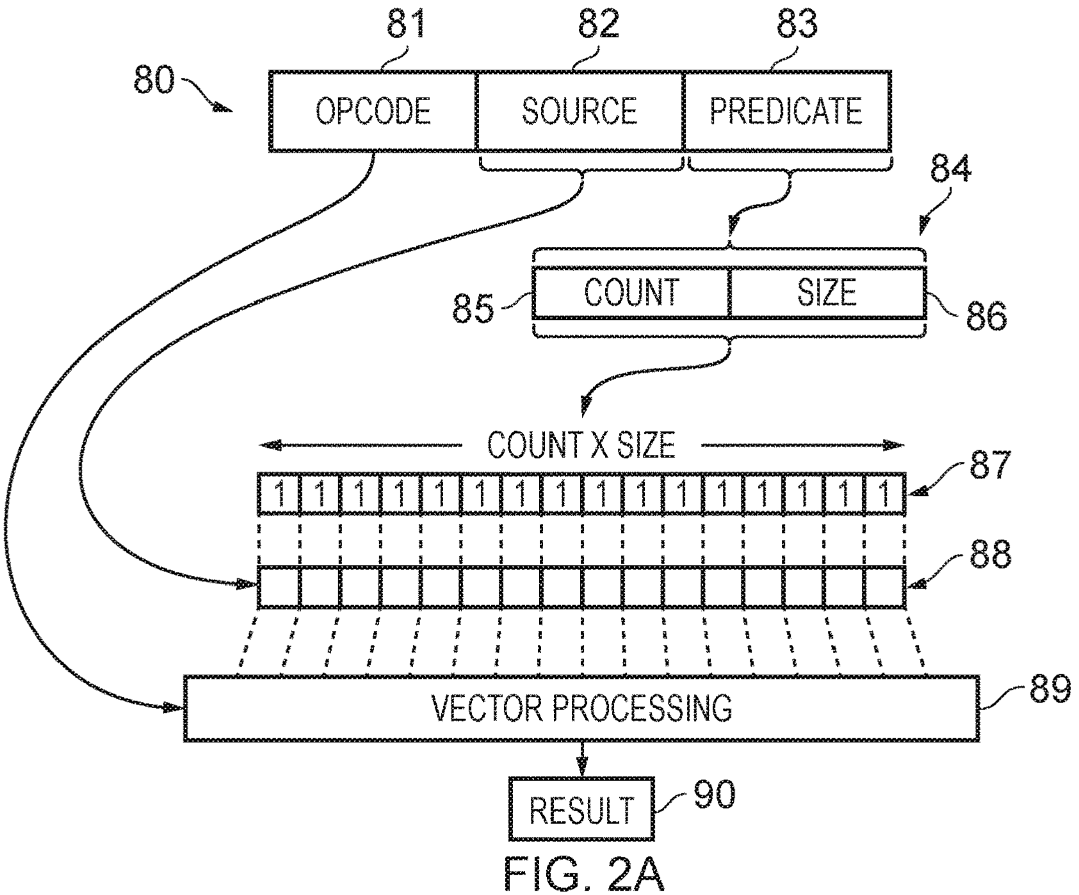
Figure 2B:
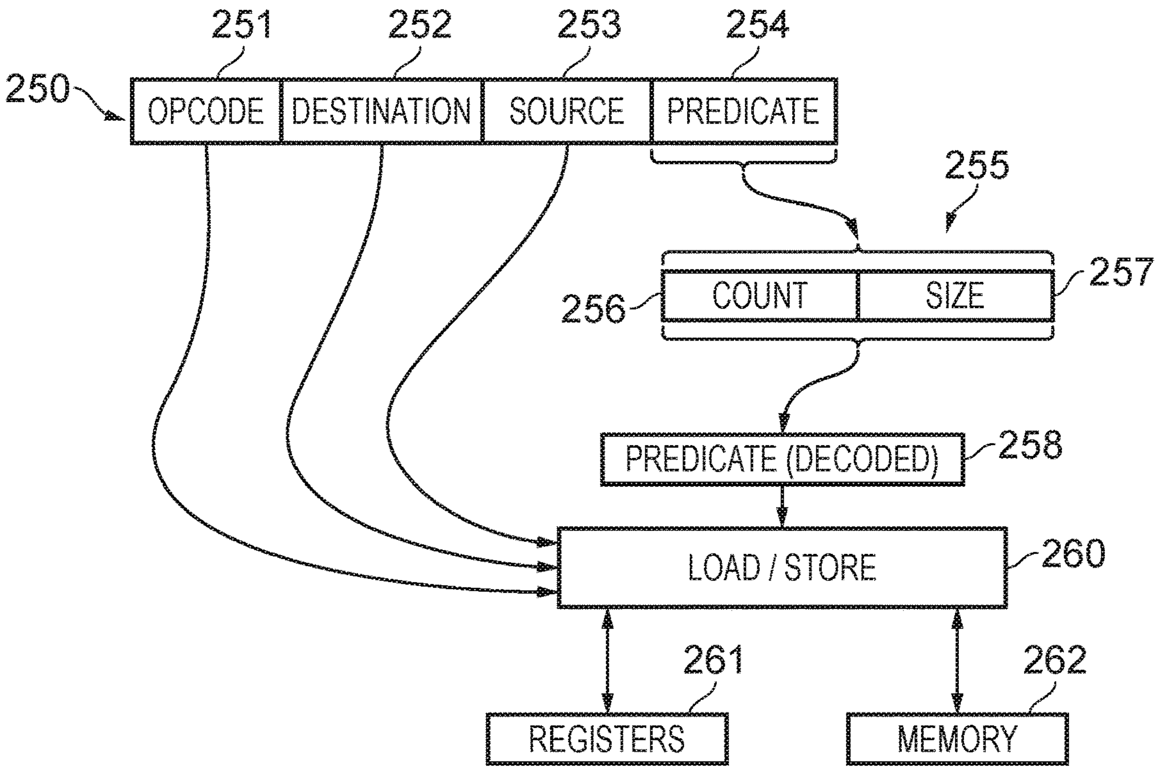
Figure 3:
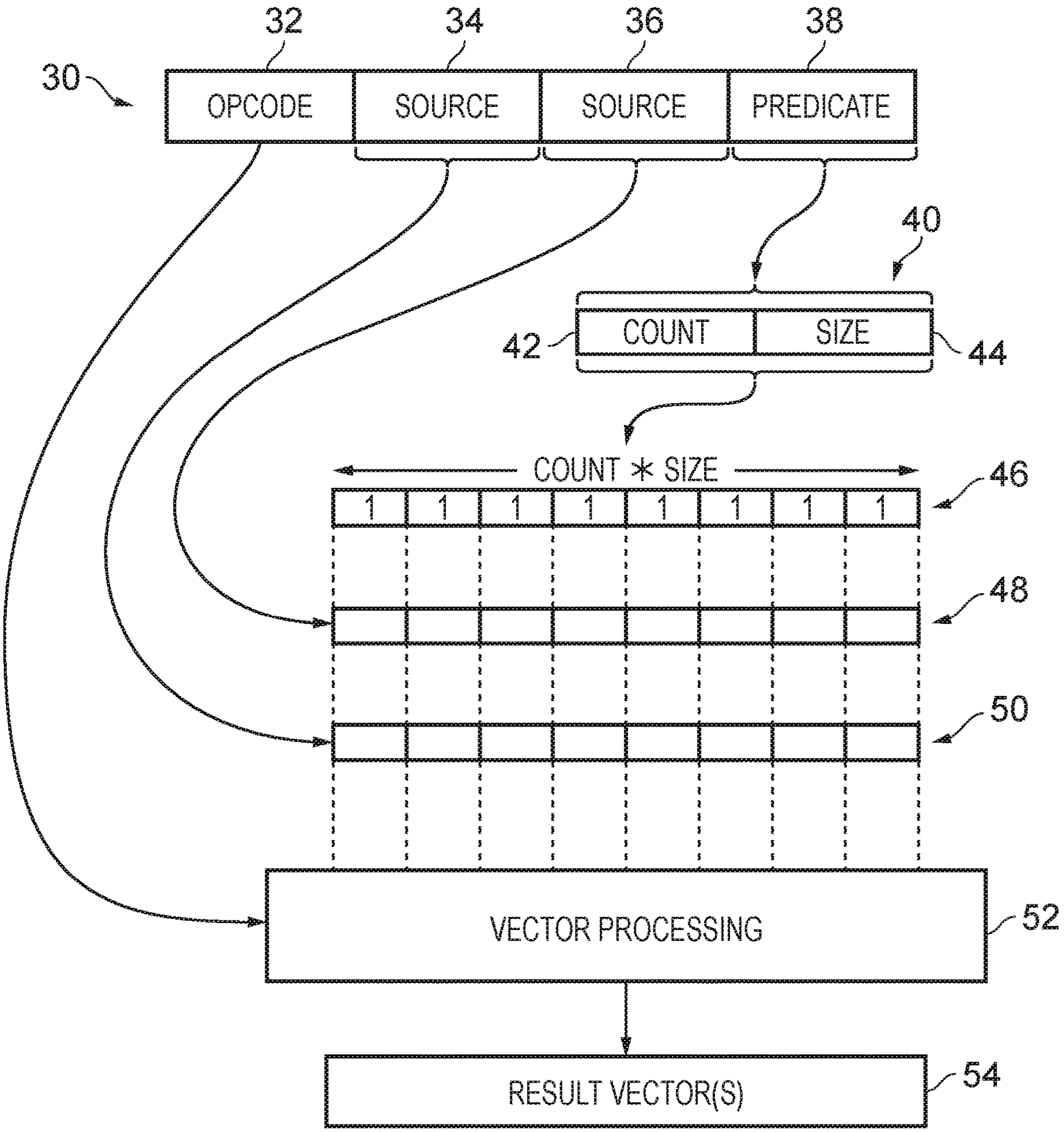
Figure 4A:
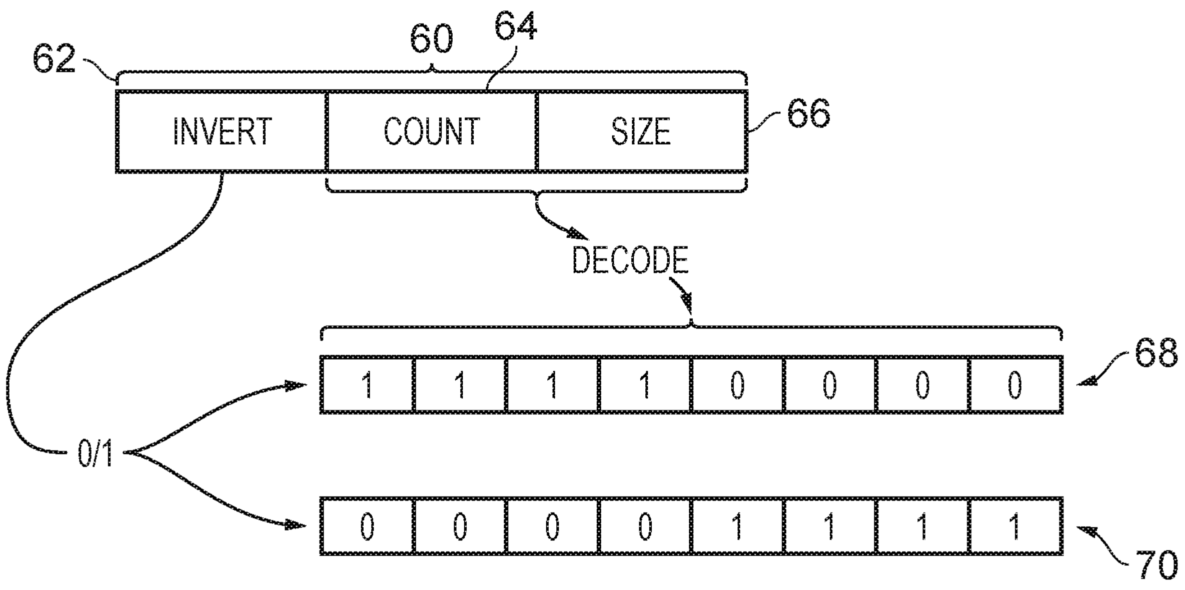
Figure 4B:
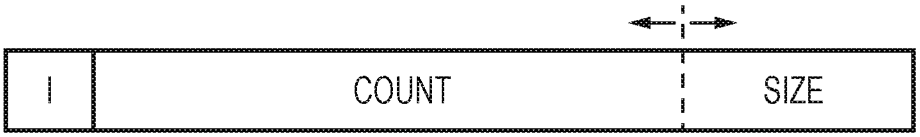
Figure 4C:
Figure 5:
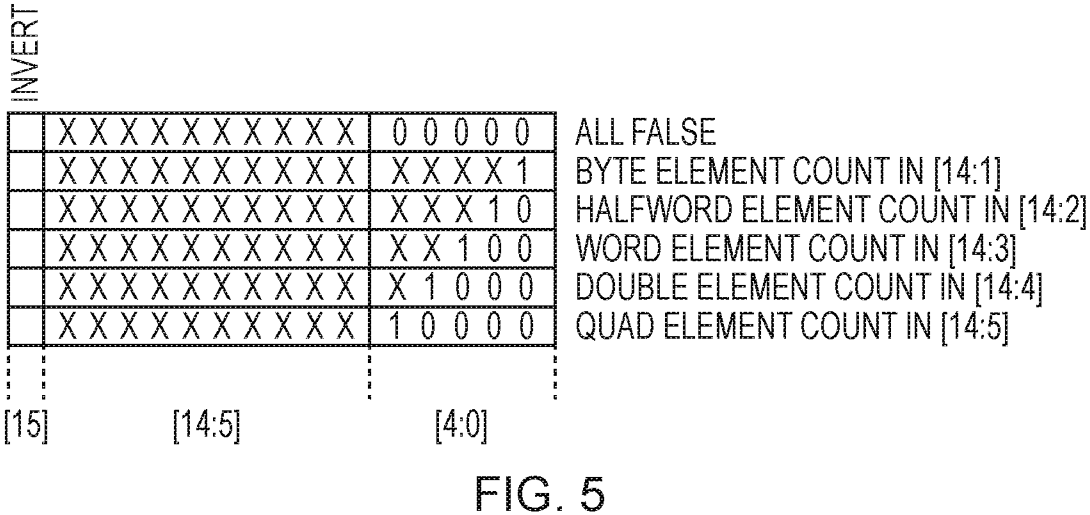
Figure 6:
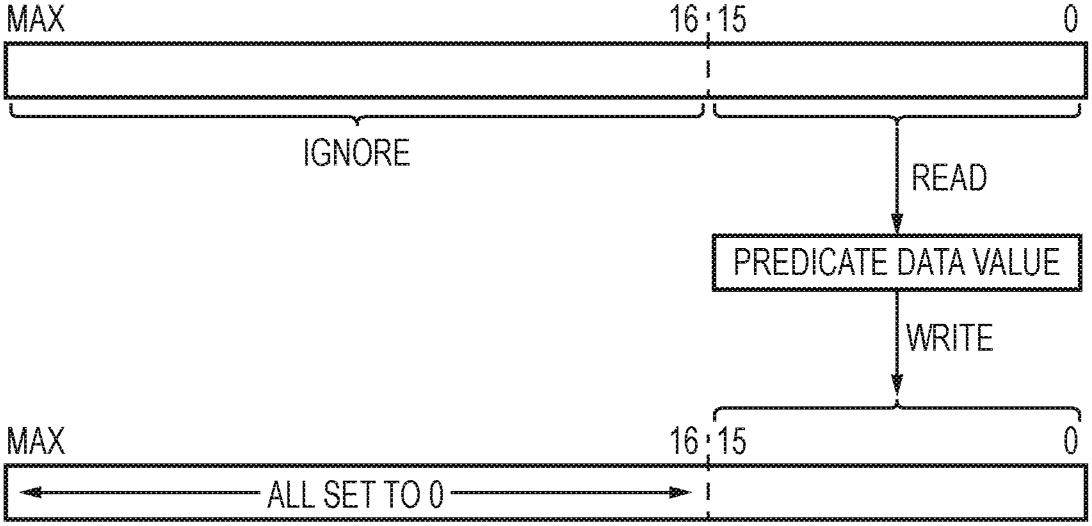
Figure 7:
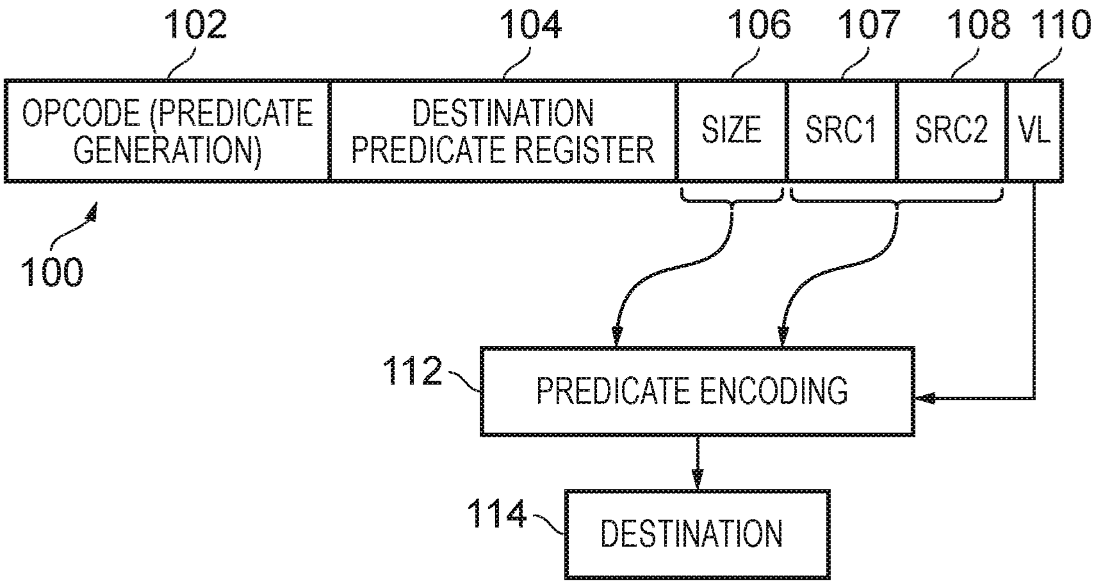
Figure 8:
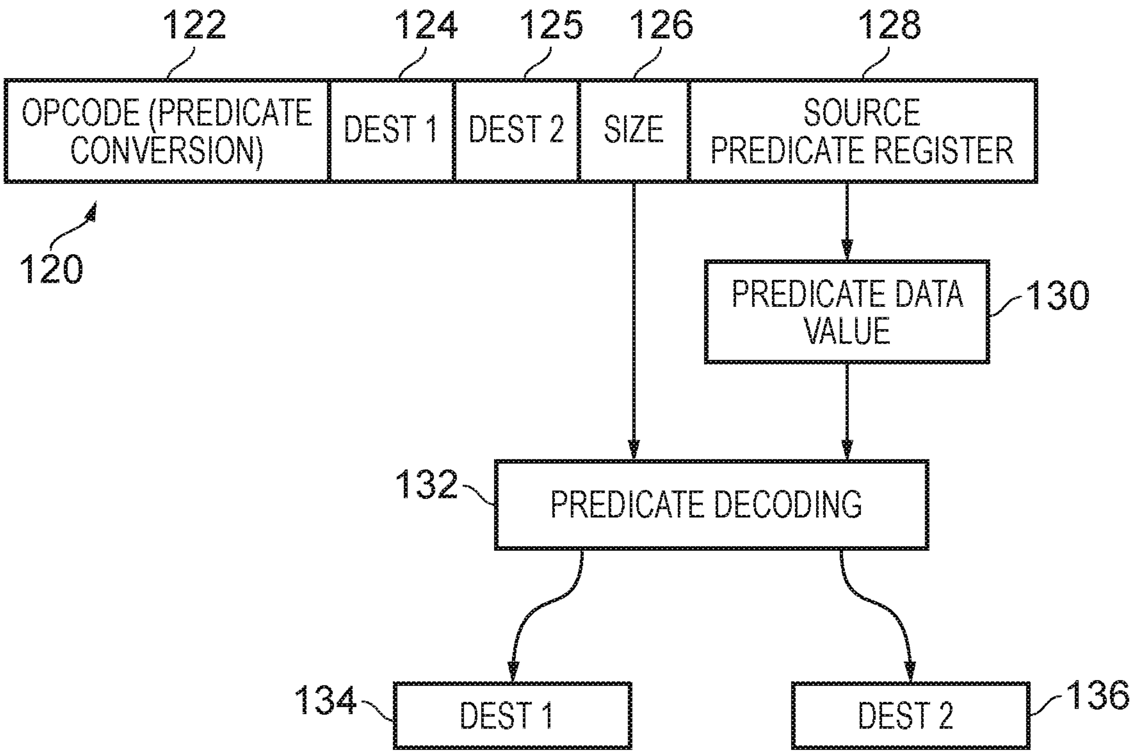
Figure 9A:
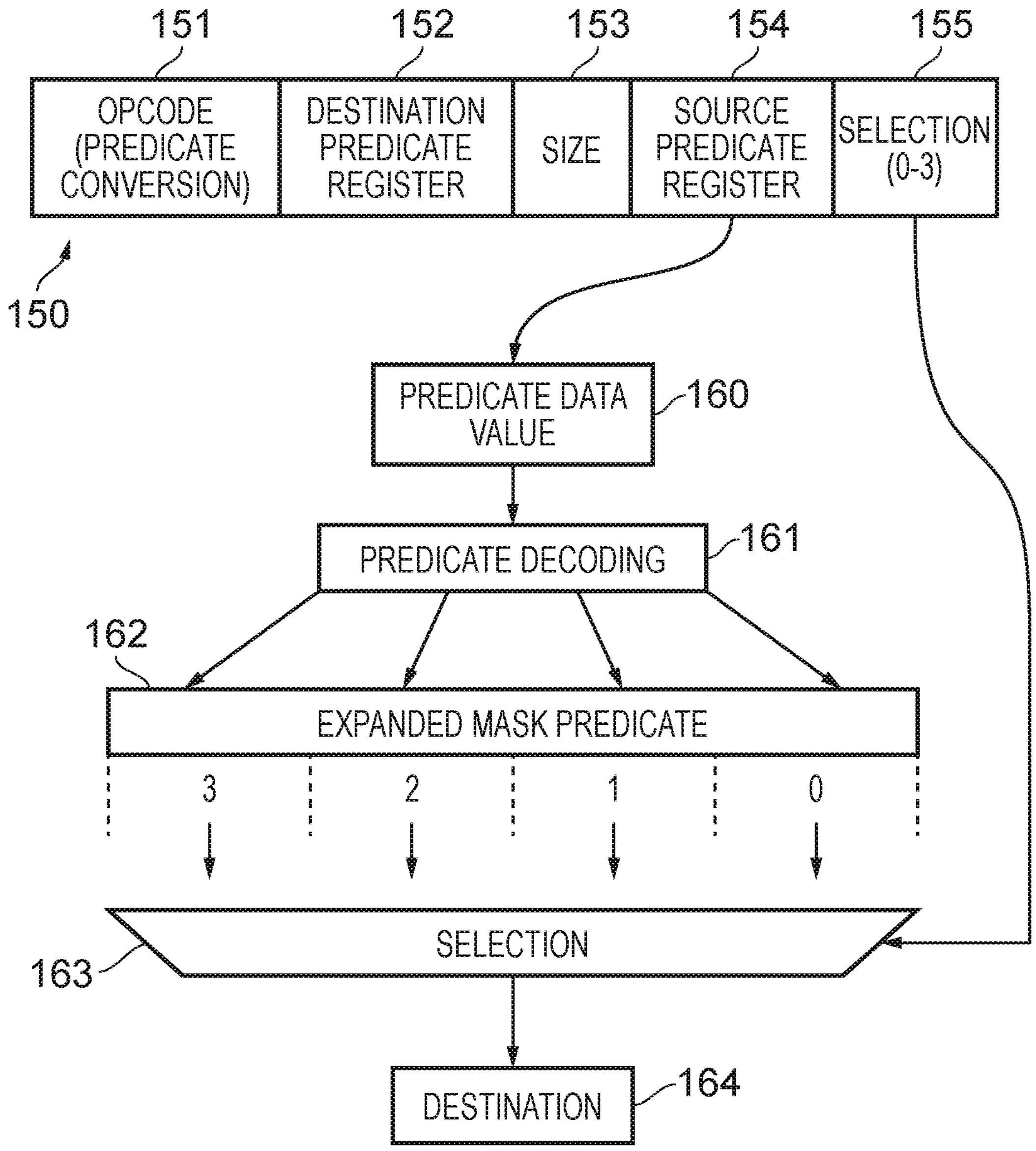
Figure 9B:
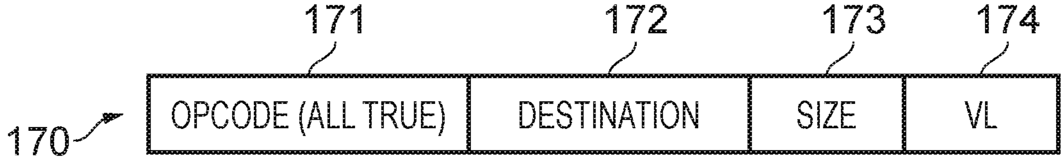
Figure 10:
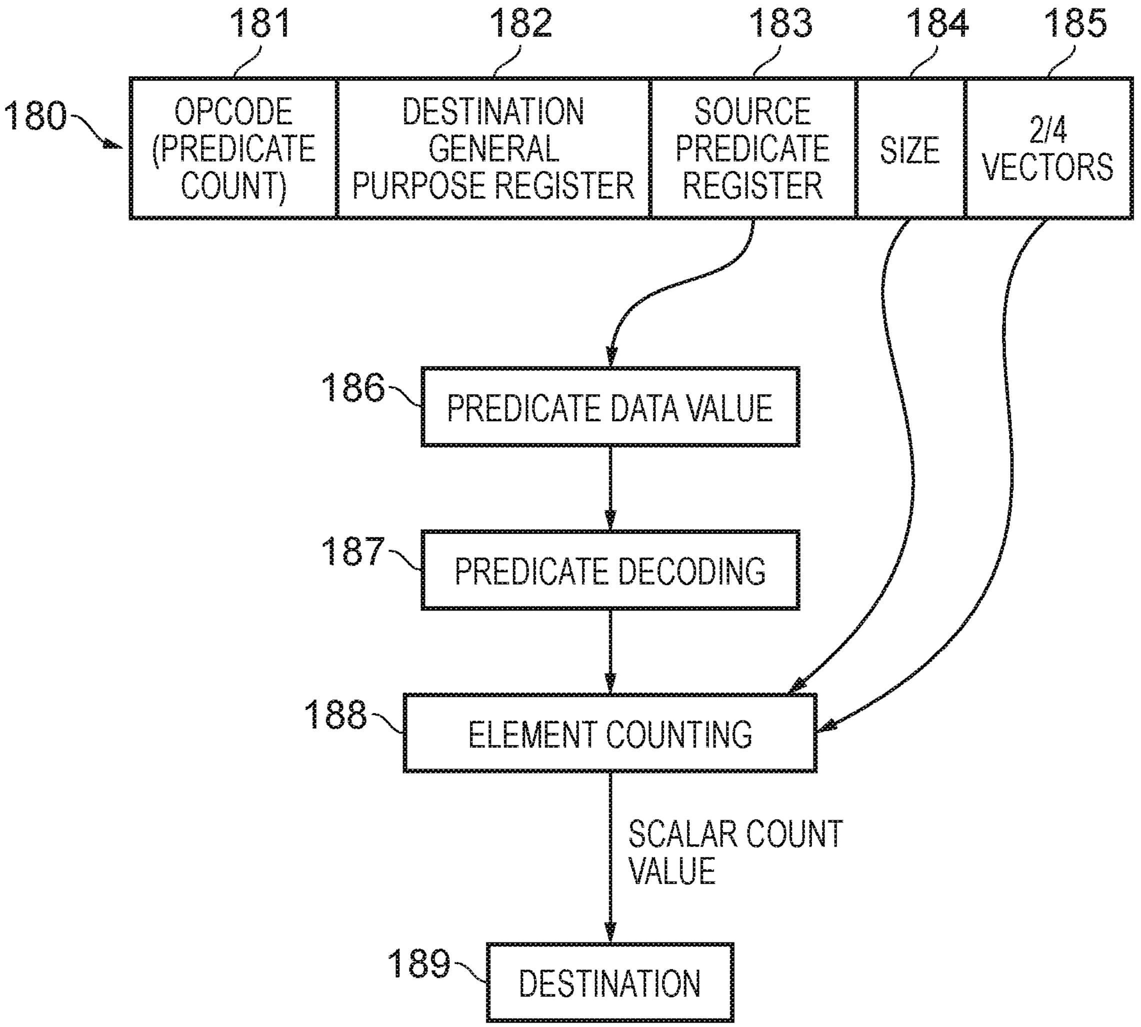
Figure 11:
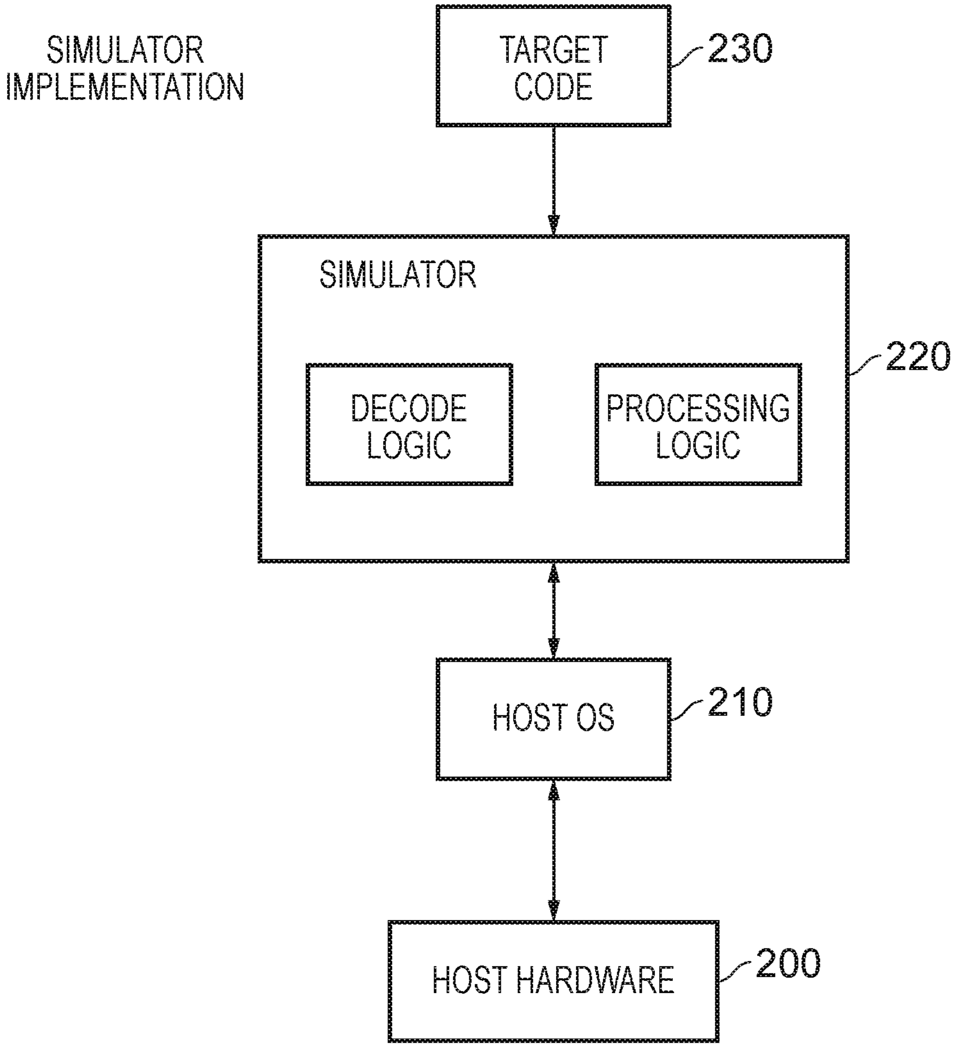

The present techniques will be described further, by way of example only, with reference to embodiments thereof as illustrated in the accompanying drawings, to be read in conjunction with the following description, in which:

FIG. 1 schematically illustrates an apparatus according to various configurations of the present techniques;

FIGS. 2A and 2B schematically illustrates the use of a vector processing instruction which specifies a vector processing operation which makes use of predicate information encoded using the predicate-as-count approach according to various configurations of the present techniques;

FIG. 3 schematically illustrates the use of a vector processing instruction which specifies a vector processing operation which makes use of predicate information encoded using the predicate-as-count approach according to various configurations of the present techniques;

FIG. 4A schematically illustrates the use of an inversion indicator in the predicate encoding according to various configurations of the present techniques;

FIG. 4B schematically illustrates the variable position of a boundary between indications of an element count and an element size in the encoding used for a predicate-as-count definition according to various configurations of the present techniques;

FIG. 4C schematically illustrates an example of bit values determining the position of a boundary between indications of an element count and an element size in the encoding used for a predicate-as-count definition according to various configurations of the present techniques;

FIG. 5 schematically illustrates the encoding used for a predicate-as-count definition according to various configurations of the present techniques;

FIG. 6 schematically illustrates the reading and writing of a predicate data value which defines a predicate-as-count according to various configurations of the present techniques;

FIG. 7 schematically illustrates the use of a predicate generation instruction according to various configurations of the present techniques;

FIG. 8 schematically illustrates the use of a size indicator in a vector processing instruction which converts a predicate-as-counter to a predicate-as-mask according to various configurations of the present techniques;

FIG. 9A schematically illustrates the use of a sub-portion indicator in a predicate conversion instruction according to various configurations of the present techniques;

FIG. 9B schematically illustrates an all-true predicate generation instruction according to various configurations of the present techniques;

FIG. 10 schematically illustrates the use of predicate count instruction according to various configurations of the present techniques; and FIG. 11 schematically illustrates a simulator implementation which may be used.

In one disclosed example herein there is an apparatus comprising:

decode circuitry to decode instructions; and processing circuitry to apply vector processing operations specified by the instructions to input data vectors, wherein the decode circuitry is responsive to a vector processing instruction specifying:

a vector processing operation;

one or more source operands; and a source predicate register, to generate control signals which cause the processing circuitry to perform the vector processing operation with respect to the source operand, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity of consecutive identical predication indicators, each predication indicator corresponding to the element size.

Predication of data processing operations is commonly achieved by the use of a predication mask, according to which the predication mask holds a number of indicators which correspond to the possible parallel positions at which a data processing operation might be applied. The respective values of the indicators then determine whether the data processing operation at the respective position is to take place or not. This approach is referred to herein as "predication-as-mask". Thus in the context of vector processing operations a predication mask may be provided which comprises a corresponding number of indicators as the number of elements in a vector which is to be subjected to a vector processing operation. The respective values of the indicators in the predication mask then determines which elements of the vector are subjected to the vector processing operation. However, the inventors of the present techniques have found that for some operations which require large amounts of predication information the use of multiple predication masks in order to cover that data width is impractical to implement. For example, this may be the case in the context of multi-vector processing and the difficulties can be all the more acute in the context of scalable vector processing, i.e. where a data processing apparatus is not constrained to perform vector processing on a fixed vector length with a fixed number of elements, but rather can perform such vector processing on scalable vectors, i.e. which may vary in length and/or element size.

In this context the present techniques provide an efficient manner for a larger amount of predication information to be provided by the content of a source predicate register than would be possible according to the traditional predication-as-mask approach. Instead of there being a one-to-one correspondence between indicators (e.g. bit values) which form content of the source predicate register and the subject elements of the operand(s) of the instruction as is the case for predication-as-mask, the present techniques make use of an encoding for the predicate data value which is held in the source predicate register, where the encoding specifies an element size and an element count. The element count indicates a multiplicity of consecutive identical predication indicators, where each predication indicator corresponds to the element size. Whilst this approach, which is referred to herein as "predication-as-count", does not support the arbitrary individual setting of predication indicators corresponding to individual elements of the source operand(s), it has been found that predication usage frequently comprises a set of active elements followed by a set of inactive elements (or vice versa) with no gaps in-between. For example, when the vector processing is handling matrix elements, the situation of a set of active elements followed by inactive elements may arise at the end of a matrix row. Conversely, the situation of a set of inactive elements followed by active elements may arise at the start of a matrix row. Where the encoding used by the present techniques enables such sets of active/inactive elements to be efficiently encoded, this requires only a single source predicate register to provide the product data value, which could nonetheless represent the required information for predication of multiple vector operands.

Thus whilst in some examples the required predication indicators could comprise a full set of active elements, or conversely a full set of inactive elements, more generally in other examples the processing circuitry is configured to decode the predicate data value to generate the consecutive identical predication indicators and a further sequence of identical predication indicators, wherein the consecutive identical predicate indicators and the further sequence of identical predication indicators comprise inverse activity indications to one another.

Where there may nonetheless be the need on occasion for all predication indicators to be the same (i.e. all active or all inactive) in some examples the processing circuitry is responsive to the element count having a predetermined value to generate all predication indicators as the consecutive identical predication indicators.

In some examples the encoding of the predicate data value further comprises an inversion bit, wherein a repeating activity indication forming the consecutive identical predication indicators is dependent on the inversion bit. Accordingly, the "polarity" of the mask information can be set by the use of this inversion bit. Moreover, the inversion bit, in combination with the element size and element count, thus defines the start of the active elements (where this will either be at the start of the set of elements in the case of active elements followed by inactive elements, or at the point within the set of elements where the active elements begin following a set of inactive elements in the case of inactive elements followed by active elements).

The encoding used may represent the element size in a variety of ways, and may be capable of representing a range of element sizes, but in some examples the encoding of the predicate data value uses an element size encoding to indicate of the element size, wherein the element size encoding comprises indications for at least one of:

the element size being byte length;

the element size being half-word length;

the element size being word length;

the element size being double-word length; and the element size being quad-word length.

The encoding of the predicate data value allows both an element size and an element count to be represented by the predicate data value, yet the portions of the predicate data value which represent these respective components need not be fixed.

Indeed, in some examples the encoding of the predicate data value comprises a predetermined portion of the predicate data value which is used to indicate the element size and the element count, wherein a boundary position in the predetermined portion of the predicate data value between a first sub-portion indicating the element size and a second sub-portion indicating the element count is dependent on the element size indicated. This variable boundary between the two sub-portions allows flexibility in how the space available in the predicate data value is used. In particular, it allows more space to be used for the element count in examples where less space is required to indicate the element size, whilst conversely it allows more space to be used for the element size in examples where less space is required to indicate the element count.

The particular manner in which the element count and the element size are represented is not limited and may take a variety of forms. However, in some examples where the boundary position is variable in the manner described above, a bit position of an active bit in the first sub-portion indicates the element size and the bit position of the active bit defines the boundary position.

An advantage of the present techniques is the particularly efficient encoding used by the predicate-as-counter, such that large amounts of predicate indicators may be represented by relatively small amount of space in the predicate data value. Indeed, the apparatus may be configured to handle predicate data values in a restricted portion of the content of the source predicate register. This may facilitate the case of implementation of the present techniques. For example, in some cases, the encoding of the predicate data value is restricted to a predetermined number of bits of the predicate data value, and the processing circuitry is configured, when reading the predicate data value from the source predicate register, to disregard any further bits held in the source predicate register beyond those which form the predetermined number of bits of the predicate data value. Equally in some cases, the encoding of the predicate data value is restricted to a predetermined number of bits of the predicate data value, and the processing circuitry is configured, when writing a new predicate data value to a target predicate register, to set to a predetermined value any further bits which can be held in the target predicate register beyond those which form the predetermined number of bits of the predication data value.

The present techniques further propose various further instructions to which the apparatus may be responsive to support the efficient creation and use of predicate-as-counter examples. Accordingly, in some examples the decode circuitry is responsive to a predicate generation instruction specifying a to-be-generated predicate and a number of vectors to be controlled by the to-be-generated predicate to generate control signals which cause the processing circuitry to generate a predicate data value which indicates a corresponding element size and a corresponding element count.

In some examples, the decode circuitry is responsive to an all-true predicate generation instruction specifying an all-true to-be-generated predicate to generate control signals which cause the processing circuitry to generate an all-true predicate data value which indicates all-active elements for the predication indicators.

In some examples, the decode circuitry is responsive to an all-false predicate generation instruction specifying an all-false to-be-generated predicate to generate control signals which cause the processing circuitry to generate an all-false predicate data value which indicates all-inactive elements for the predication indicators.

Although the predicate-as-counter representation provides a particularly efficient encoding density of predicate information, the present techniques nonetheless recognise that situations may arise in which the traditional predicate-as-mask representation may be usefully employed, and accordingly at least one instruction is proposed which enables the conversion from the predicate-as-counter representation to the predicate-as-mask representation. Accordingly, in some examples the decode circuitry is responsive to a predicate conversion instruction specifying a source predicate register holding a to-be-converted predicate data value to generate control signals which cause the processing circuitry to decode the to-be-converted predicate data value and to generate a converted predicate data value, wherein the converted predicate data value comprises a direct mask-style representation in which bit values at bit positions indicate predication of elements in a subject data item.

Where the predicate-as-counter representation may readily cover a much greater number of elements than an equivalently sized predicate-as-mask representation, it is further proposed that the predicate-as-counter representation may be converted into more than one predicate-as-mask. Accordingly, in some examples the predicate conversion instruction specifies more than one destination predicate register and the control signals cause the processing circuitry to generate more than one converted predicate data value, wherein each of the more than one converted predicate data values comprises the direct mask-style representation, and wherein each of the more than one converted predicate data values corresponds to a different subset of the predication indicators represented by the to-be-converted predicate data value.

In some examples the predicate conversion instruction specifies a multiplicity of the more than one converted predicate data values to be generated.

In some examples the predicate conversion instruction specifies which of multiple possible subsets of the predicate bits represented by the to-be-converted predicate data value are to be generated.

In some examples the decode circuitry is responsive to a predicate counting instruction specifying a source predicate register holding a to-be-counted predicate data value to generate control signals which cause the processing circuitry to decode the to-be-converted predicate data value to determine predication indicators indicated by the to-be-converted predicate data value and to store a scalar value corresponding to a number of active elements in the predication indicators in a destination general-purpose register.

In some examples the predicate counting instruction specifies an upper limit of the number of active elements to be counted, wherein the upper limit corresponds to one of: two vector lengths; and four vector lengths.

The one or more source operands may indicate various types of data item or data items which are to be the subject of the vector processing operation. The type of data item is not limiting on the present techniques as long as it comprises multiple elements which may be subjected to predication as part of the operation. Moreover, there may be just one source operand or there may be multiple source operands. In the case of multiple source operands, when the predication is to apply to all of those multiple source operands there is an implied order to the operands, such that a first part of the predication information that is encoded in the predicate data value is applied to a first source operand, a second part of the predication information that is encoded in the predicate data value is applied to a second source operand, and so on as appropriate. The source operands may indicate vector registers (in particular they may be scalable vector registers) or alternatively they may indicate a consecutive range of memory locations. Indeed, a source vector itself may indicate a range of memory locations, by means of pointers, i.e. gather (load) or scatter (store) operations. In the case of a range of memory locations, the predication controls which specific locations are to be accessed/not accessed either for a load or a store operation.

As such in some examples the one or more source operands comprise: one source vector register; two source vector registers; or three source vector registers. Further numbers of source vector registers are also possible. In some examples the one or more source operands comprise: a range of memory locations. The range of memory locations may be single consecutive block of memory locations, or may be indicated by a set pointers and thus potentially scattered across a wider memory space.

In some examples the vector processing instruction further specifies a destination vector register.

In some examples the vector processing instruction further specifies a destination memory location.

In one disclosed example herein there is a method of data processing comprising:

decoding instructions; and controlling processing circuitry to apply vector processing operations specified by the instructions to input data vectors, wherein the decoding comprises, in response to a vector processing instruction specifying:

a vector processing operation;

one or more source operands; and a source predicate register, generating control signals which cause the processing circuitry to perform the vector processing operation with respect to the source operand, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity consecutive identical predication indicators, each predication indicator corresponding to the element size.

In one disclosed example herein there is a computer program for controlling a host processing apparatus to provide an instruction execution environment comprising:

decode logic to decode instructions; and processing logic to apply vector processing operations specified by the instructions to input data vectors, wherein the decode logic is responsive to a vector processing instruction specifying:

a vector processing operation;

one or more source operands; and a source predicate register, to generate control signals which cause the processing logic to perform the vector processing operation with respect to source operands, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity of consecutive identical predication indicators, each predication indicator corresponding to the element size.

Some particular embodiments are now described with reference to the figures.

FIG. 1 schematically illustrates a processing apparatus 10 which may embody various examples of the present techniques. The apparatus comprises data processing circuitry 12 which performs data processing operations on data items in response to a sequence of instructions which it executes. These instructions are retrieved from the memory 14 to which the data processing apparatus has access and, in a manner with which one of ordinary skill in the art will be familiar, fetch circuitry 16 is provided for this purpose. Furthermore, instructions retrieved by the fetch circuitry 16 are passed to the instruction decoder circuitry 18 (otherwise referred to as decode circuitry), which generates control signals which are arranged to control various aspects of the configuration and operation of the processing circuitry 12, as well as of a set of registers 20 and a load/store unit 22. Generally, the data processing circuitry 12 may be arranged in a pipelined fashion, yet the specifics thereof are not relevant to the present techniques. One of ordinary skill in the art will be familiar with the general configuration which FIG. 1 represents and further detailed description thereof is dispensed herewith merely for the purposes of brevity. The registers 20, as can be seen in FIG. 1, each comprise storage for multiple data elements, such that the processing circuitry can apply data processing operations either to a specified data element within a specified register, or can apply data processing operations to a specified group of data elements (a "vector") within a specified register. Within the set of available registers 20, some are designated as general purpose registers arranged to hold data values of a given size, which characterises the data processing characteristics of the apparatus. For example, these may be 64-bit data values, although the present techniques are not limited to any particular such data value size. Other registers within the set of available registers may be explicitly configured as vector registers, where the vector length which those vector registers hold may further be "scalable", i.e. not fixed, but vary between predetermined upper and lower limits. For example, the apparatus 10 may be arranged in accordance with the Scalable Vector Extension (SVE) of the Arm AArch64 architecture provided by Arm Limited, Cambridge, UK, which supports vector lengths which can vary from a minimum of 128 bits up to a maximum of 2048 bits, at 128-bit increments. Other registers in the set may be designated as predicate registers and in the context of a scalable vector processing configuration as scalable predicate registers, arranged to hold predicate indicators to control the application of vector processing operations to corresponding scalable vectors. When configured in the above-mentioned SVE configuration, the apparatus 10 then includes (in addition to other general purpose registers): 32 scalable vector registers and 16 scalable predicate registers. Other examples and types of registers may also be provided, though are not of direct relevance to the present techniques are therefore not discussed here. The use of these (scalable) vector (predicate) registers with respect to data elements held in the registers 20 will be explained in more detail below with reference to some specific embodiments. Data values required by the data processing circuitry 12 in the execution of the instructions, and data values generated as a result of those data processing instructions, are written to and read from the memory 14 by means of the load/store unit 22. Note also that generally the memory 14 in FIG. 1 can be seen as an example of a computer-readable storage medium on which the instructions of the present techniques can be stored, typically as part of a predefined sequence of instructions (a "program"), which the processing circuitry then executes. The processing circuitry may however access such a program from a variety of different sources, such in RAM, in ROM, via a network interface, and so on. The present disclosure describes various novel instructions which the processing circuitry 12 can execute and the figures which follow provide further explanation of the nature of these instructions, variations in the data processing circuitry in order to support the execution of those instructions, and so on.

FIG. 2A schematically illustrates the use of a vector processing instruction which specifies a vector processing operation which makes use of predicate information encoded using the predicate-as-count approach in some examples. A vector processing instruction 80 is shown which comprises an opcode 81, an indication of a source operand 82, and an indication of a source predicate register 83. A predicate data value 84 retrieved from the source predicate register 83 comprises an element count indication 85 and an element size indication 86. Hence the predication information represented by the predicate data value 84 represents a sequence of predication indicators, where each is of size 86 and repeats count 85 times. For example, where the size 86 indicates that the predication indicators correspond to an element size of 8-bits and count 85 represents "8", then indicates predication information covering a 64-bit width (i.e. the element size times the element count). An example is illustrated of a set of predication indicators 87, where each is labelled "1", which indicates a set of active elements. This set of predication indicators 87 then controls which elements of the data item (retrieved from the indicated source 82 in the instruction 80) are subjected to the vector processing operation. This vector processing operation is defined by the particular opcode 82 in the instruction 80. The result 90 of the vector processing may then be used in various ways (e.g. stored in a destination register also be specified in the instruction, although that aspect has been omitted in the illustration of FIG. 2A purely for the purposes of clarity). Accordingly, the vector processing circuitry 89 is provided as part of the processing circuitry 12 shown in FIG. 1, and the decoding of the predicate data value also takes place within this processing circuitry 52. It should also be appreciated that the example shown in FIG. 2A is that of a particularly short and simple set of eight identical predication indicators 87, this having been done purely for the purposes of clarity of illustration. More generally the present techniques may readily be used to encode far longer sequences of identical predication indicators, such as are applicable to scalable vector processing examples, such as those in accordance with the above-mentioned SVE of the Arm AArch64 architecture.

FIG. 2B schematically illustrates the use of a vector processing instruction which specifies a vector processing operation which makes use of predicate information encoded using the predicate-as-count approach in some examples. A vector processing instruction 250 is shown which comprises an opcode 251, an indication of destination operand 252, an indication of a source operand 253, and an indication of a source predicate register 254. A predicate data value 255 retrieved from the source predicate register 254 comprises an element count indication 256 and an element size indication 257. Hence the predication information represented by the predicate data value 255 represents a sequence of predication indicators, where each is of size 257 and repeats count 256 times. For example, where the size 257 indicates that the predication indicators correspond to an element size of 16-bit and count 256 represents "32", then indicates predication information covering a 512-bit width (i.e. the element size times the element count). The operation defined by the particular opcode 251 in the instruction 250 in the case of FIG. 2B is either a vector load or a vector store operation, and is carried out by the load/store circuitry 260 (which can generally be considered part of the programmed processing circuitry, even though for clarity of illustration it is shown separately in FIG. 1). In the case of a load operation, the source operand 253 indicates a range of memory locations and the set of predication indicators 258 controls which "elements" are loaded from that range of memory locations, these being loaded into the destination vector register 252. The load/store circuitry 260 accesses memory 262 and registers 261 (e.g. memory 14 and registers 20 in FIG. 1). In the case of a store operation, the source operand 253 indicates a source vector register and the set of predication indicators 258 controls which elements from that source are stored to a range of memory locations, these being indicated by the destination operand 252. For both the load and the store operations the range of memory locations may be indicated by a set of pointers (i.e. the source or destination operand pertaining to memory locations is in fact a vector register holding a set of pointers), allowing gather/scatter type loads and stores to be carried out (predicated by the predicate data value).

FIG. 3 schematically illustrates the use of a vector processing instruction which specifies a vector processing operation which makes use of predicate information encoded using the predicate-as-count approach in some examples. A vector processing instruction 30 is shown which comprises an opcode 32, an indication of a first source vector register 34, an indication of a second source vector register 36, and an indication of a source predicate register 38. A predicate data value 40 retrieved from the source predicate register 38 comprises an element count indication 42 and an element size indication 44. Hence the predication information represented by the predicate data value 40 represents a sequence of predication indicators, where each is of size 44 and repeats count 42 times. For example, where the size 44 indicates that the predication indicators correspond to an element size of 8-bits, a count 42 representing "8", then indicates predication information covering a 64-bit width (i.e. the element size times the element count). An example is illustrated of a set of predication indicators 46, where each is labelled "1", which indicates a set of active elements. This set of predication indicators 46 then controls which elements of the respective vectors 48 and 50 (retrieved from two source vector registers in accordance with the indications 34 and 36 in the instruction 30) are subjected to the vector processing operation. This vector processing operation is defined by the particular opcode 32 in the instruction 30. The result of the vector processing may then be one or more result vectors 54. Indeed, typically one or more destination vector registers will also be specified in the instruction, although that aspect has been omitted in the illustration of FIG. 3 purely for the purposes of clarity. Accordingly, the vector processing circuitry 52 is provided as part of the processing circuitry 12 shown in FIG. 1, and the decoding of the predicate data value also takes place within this vector processing circuitry 52. It should also be appreciated that the example shown in FIG. 3 is that of a particularly short and simple set of eight identical predication indicators 46, this having been done purely for the purposes of clarity of illustration. More generally the present techniques may readily be used to encode far longer sequences of identical predication indicators, such as are applicable to scalable vector processing examples, such as those in accordance with the above-mentioned SVE of the Arm AArch64 architecture.

FIG. 4A schematically illustrates the use of an inversion indicator in the predicate encoding according to some examples. The predication data value 60 further comprises an inversion indication 62 (which may be provided as a single bit indicative of inversion or no inversion), in addition to the element count 64 and the element size 66 discussed above. The effect of the inversion indication 62 is to invert the relative positions of the active and inactive predication elements. Thus in a first configuration 68 the active elements are followed by the inactive elements, whilst in a second configuration 70 the inactive elements are followed by the active elements. Once more it should be appreciated that the example shown in FIG. 4A is also of a particularly short and simple set of predication indicators, this having been done purely for the purposes of clarity of illustration. More generally the present techniques may readily represent much longer sequences of identical active and/or inactive elements of glass. Seen from a slightly different perspective it can be seen that the value of the inversion indication 62 indicates the start of the active elements, whereby in one configuration the active elements begin at the leftmost predication position and repeat according to the count value, the remainder of the predication indications being inactive elements. In the other configuration inactive elements begin the leftmost predication position and repeat, until the position is reached which allows the remainder of the predication indications of active elements to have a multiplicity which matches the count value.

FIG. 4B schematically illustrates the variable position of a boundary between indications of an element count and an element size in the encoding used for a predicate-as-count definition according to various examples. The encoding shown comprises an inversion indicator (I), an element count indicator, and an element size indicator. Moreover, shown in the figure, the boundary between the portion holding the element count indicator and the portion holding the element size indicator can vary in position. In particular, it varies depending on the element size indicated, this allowing more or less space for the element count indicator.

FIG. 4C schematically illustrates an example of bit values determining the position of a boundary between indications of an element count and an element size in the encoding used for a predicate-as-count definition according to various examples. Here the encoding used represents the element size as “1000”. The leading 1 is thus determinative of the value indicated and this “active bit” thus determines the boundary between the portion holding the element count indicator and the portion holding the element size indicator. Were a different element size to be indicated by “10”, this would move the boundary to the right (in the orientation illustrated) and allow two more bits to be used for the element count indicator.

FIG. 5 schematically illustrates the encoding used for a predicate-as-count definition according to various examples. This particular encoding makes use of the lowest numbered 16 bits of an SVE predicate register. Bit is used as the inversion indicator, with 1 indicative of inversion and 0 indicative of no inversion. Bits [14:0] are used to represent the element count and element size, wherein the boundary between the element count portion and the element size portion is at a variable position, dependent on the element size indication. As can be seen in FIG. 4B the encoding used to represent the element size is a binary 1, followed by between 0 and 4 binary 0s. As shown in the figure:

[0]=1 indicates byte element size (and leaves bits [14:1] available to encode the element count;

[1:0]=10 indicates half word element size (and leaves bits [14:2] available to encode the element count;

[2:0]=100 indicates word element size (and leaves bits [14:3] available to encode the element count;

[3:0]=1000 indicates double word element size (and leaves bits [14:4] available to encode the element count; and

[4:0]=10000 indicates quad word element size (and leaves bits [14:5] available to encode the element count.

Further the encoding of [4:0]=00000 is allocated the special meaning of all false (inactive) elements. Accordingly, when [15]=1 and [4:0]=00000, this indicates all true (active) elements, i.e. this is the canonical form of the all-active predicate using the predicate-as-counter representation.

FIG. 6 schematically illustrates the reading and writing of a predicate data value which defines a predicate-as-count according to various examples. A predicate register is shown, where a read operation on the predicate register only takes the lowest 16 bits, and any bits above this are ignored. The upper-most bit of the predicate register is labelled in the figure as “MAX”, since the size of the predicate register may vary, in particular in the context of a scalable vector processing implementation. For example, an SVE configuration may be implemented with the scalable vector registers being of length 128-2048 bits and able to hold 64, 32, 16, or 8-bit elements. Correspondingly, the scalable predicate registers, which are ⅛ of the scalable vector length (in order to be able to predicate 8-bit elements) may be 16-256 bits in length. Where the minimum predicate register length is then 16-bit, the present techniques are presented in that context, with a predicate-as-counter encoding which occupies a 16-bit space. Any bits above this are therefore ignored when reading a predicate data value, as shown in FIG. 6. Conversely, when a predicate data value is written into a predicate register, only the lowest 16 bits are set in accordance with the predicate-as-counter encoding and any bits above this are set to 0.

FIG. 7 schematically illustrates the use of a predicate generation instruction according to various examples. A predicate generation instruction 100 comprises an opcode 102 indicative of the type of instruction, an indication of a destination predicate register 104, an element size indication 106, two source general-purpose register indications 107 and 108, and an operand (VL) 110, which indicates the number of vectors to be controlled by this predicate. The particular operation which the predicate generation instruction 100 triggers in order to generate the content of the predicate from the content of the two source general-purpose registers take a range forms, with the following being just a few examples:

Generate a predicate-as-count with the difference between the second signed scalar operand and the first signed scalar operand, if this difference is positive or zero otherwise.

Generate a predicate-as-count with the difference between the second unsigned scalar operand and the first unsigned scalar operand, if this difference is positive or zero otherwise.

Generate a predicate-as-count with the difference between the first signed scalar operand and the second signed scalar operand, if this difference is positive or zero otherwise.

Generate a predicate-as-count with the difference between the first unsigned scalar operand and the second unsigned scalar operand, if this difference is positive or zero otherwise.

The operand (VL) 110 indicating the number of vectors to be controlled by this predicate in this example is a single bit, indicating either 2 or 4 vectors to be controlled. This then determines the maximum value that can be stored in the element count of the predicate-as-mask. For example, for a 512-bit scalable vector length (SVL) and when four vectors are to be controlled by the predicate gives a total (quadrupled) SVL of 256 bytes. With a smallest element size of byte length, the maximum count value is 256. Referring to the example encoding of FIG. 5, this would require bits [8:1] to be used for the element count, with bit [0] set to 1 to indicate byte size elements. Bits [14:9] are then ignored in this example (e.g. when the predicate is read for use controlling a 512-bit SVL. Bit is still read as the inversion indicator. The predicate thus generated accordingly by the predicate encoding circuitry 112, which is provided as part of the processing circuitry 12 shown in FIG. 1. The operand (VL) 110, indicating the number of vectors to be controlled by this predicate, thus also determined the number of elements that should be considered for all-active and last-active checks when setting condition flags.

FIG. 8 schematically illustrates the use of a size indicator in a vector processing instruction which converts a predicate-as-counter to a predicate-as-mask according in various examples. A predicate conversion instruction 120 comprises an opcode 122 indicative of the type of instruction, an indication of a first destination predicate register 124, an indication of a second destination predicate register 125, an element size indication 126, and a source predicate register indication 128. A predicate data value 130 (with predicate-as-counter encoding) is retrieved from the source predicate register 128 and forms the subject of predicate decoding 132 (which is carried out by the processing circuitry 12 shown in FIG. 1). The resulting predicate-as-mask is then stored across the two destination predicate registers 134 and 136.

FIG. 9A schematically illustrates the use of a sub-portion indicator in a predicate conversion instruction according to various examples. A predicate conversion instruction 150 comprises an opcode 151 indicative of the type of instruction, an indication of a destination predicate register 152, an element size indication 153, a source predicate register indication 154, and a sub-portion selection indicator 155. A predicate data value 160 (with predicate-as-counter encoding) is retrieved from the source predicate register 154 and forms the subject of predicate decoding 161 (which is carried out by the processing circuitry 12 shown in FIG. 1). This results in the “expanded” predicate-as-mask 162, which in full has a length corresponding (in this example) to 4 vector lengths. The sub-portion selection indicator 155 controls selection circuitry 163, which causes a selected one of the sub-portions to be stored in the destination predicate register 164.

FIG. 9B schematically illustrates an all-true predicate generation instruction 170 according to various examples, which comprises an opcode 171 indicative of the type of instruction, an indication of a destination predicate register 172, an element size indication 173, and an operand (VL) 174, which indicates the number of vectors to be controlled by this predicate. This instruction causes the defined number of vectors worth of active elements to be generated in predicate-as-counter encoding.

FIG. 10 schematically illustrates the use of predicate count instruction according to various examples. A predicate count instruction 180 comprises an opcode 181 indicative of the type of instruction, an indication of a destination general purpose register 182, a source predicate register indication 183, an element size indication 184, and an operand (VL) 185, which indicates the limit of the number of elements to be counted, which corresponds to the number of vectors controlled by this predicate. A predicate data value 186 (with predicate-as-counter encoding) is retrieved from the source predicate register 186 and forms the subject of predicate decoding 187 (which is carried out by the processing circuitry 12 shown in FIG. 1). Element counting circuitry 188 (also forming part of the processing circuitry 12 shown in FIG. 1) then determines the element count from the decoded predicate and causes this scalar count value to be stored in the general purpose register 189. This counting takes into account the element size in the number of vectors indicated.

Various examples of instructions have been given above relating to the predicate-as-counter. Generally, predicated multi-vector instructions consume a predicate-as-counter as the governing predicate. In those instructions both the number of active elements and the width (size) of the elements in the predicate-as-counter encoding are taken into consideration. This allows for the width of the operation to be narrower or wider than the element size in the predicate-as-counter encoding.

FIG. 11 schematically illustrates a simulator implementation which may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 200, optionally running a host operating system 210, supporting the simulator program 220. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in “Some Efficient Architecture Simulation Techniques”, Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 200), some simulated embodiments may make use of the host hardware, where suitable.

The simulator program 220 may be stored on a computer-readable storage medium (which may be a non-transitory medium), and provides a program interface (instruction execution environment) to the target code 230 (which may include applications, operating systems and a hypervisor) which is the same as the interface of the hardware architecture being modelled by the simulator program 220. Thus, the program instructions of the target code 230, including the above mentioned instructions for the generation and manipulation of predicate-as-counter encoded predicates described above, may be executed from within the instruction execution environment using the simulator program 220, so that a host computer 200 which does 5 not actually have the hardware features of the apparatus 10 discussed above can emulate these features.

In brief overall summary, apparatuses, methods and programs are disclosed relating to the predication of multiple vectors in vector processing. An encoding of predicate information is disclosed which comprises an element size and an element count, wherein the predicate information comprises a multiplicity of consecutive identical predication indicators given by the element count, each predication indicator corresponding to the element size.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. Apparatus comprising:

decode circuitry configured to decode instructions; and processing circuitry configured to apply vector processing operations specified by the instructions to input data vectors, wherein the decode circuitry is responsive to a vector processing instruction specifying:

a vector processing operation;

one or more source operands; and a source predicate register, to generate control signals which cause the processing circuitry to perform the vector processing operation with respect to the source operand, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity of consecutive identical predication indicators, each predication indicator corresponding to the element size.

2. The apparatus as claimed in claim 1, wherein the processing circuitry is configured to decode the predicate data value to generate the consecutive identical predication indicators and a further sequence of identical predication indicators, wherein the consecutive identical predicate indicators and the further sequence of identical predication indicators comprise inverse activity indications to one another.

3. The apparatus as claimed in claim 1, wherein the processing circuitry is responsive to the element count having a predetermined value to generate all predication indicators as the consecutive identical predication indicators.

4. The apparatus as claimed in claim 1, wherein the encoding of the predicate data value further comprises an inversion bit, wherein a repeating activity indication forming the consecutive identical predication indicators is dependent on the inversion bit.

5. The apparatus as claimed in claim 1, wherein the encoding of the predicate data value uses an element size encoding to indicate of the element size, wherein the element size encoding comprises indications for at least one of:

the element size being byte length;

the element size being half-word length;

the element size being word length;

the element size being double-word length; and the element size being quad-word length.

6. The apparatus as claimed in claim 1, wherein the encoding of the the predicate data value comprises a predetermined portion of the predicate data value which is used to indicate the element size and the element count, wherein a boundary position in the predetermined portion of the predicate data value between a first sub-portion indicating the element size and a second sub-portion indicating the element count is dependent on the element size indicated.

7. The apparatus as claimed in claim 5, wherein the encoding of the predicate data value comprises a predetermined portion of the predicate data value which is used to indicate the element size and the element count, wherein a boundary position in the predetermined portion of the predicate data value between a first sub-portion indicating the element size and a second sub-portion indicating the element count is dependent on the element size indicated, and wherein a bit position of an active bit in the first sub-portion indicates the element size and the bit position of the active bit defines the boundary position.

8. The apparatus as claimed in claim 1, wherein the encoding of the predicate data value is restricted to a predetermined number of bits of the predicate data value, and the processing circuitry is configured, when reading the predicate data value from the source predicate register, to disregard any further bits held in the source predicate register beyond those which form the predetermined number of bits of the predicate data value.

9. The apparatus as claimed in claim 1, wherein the encoding of the predicate data value is restricted to a predetermined number of bits of the predicate data value, and the processing circuitry is configured, when writing a new predicate data value to a target predicate register, to set to a predetermined value any further bits which can be held in the target predicate register beyond those which form the predetermined number of bits of the predication data value.

10. The apparatus as claimed in claim 1, wherein the decode circuitry is responsive to a predicate generation instruction specifying a to-be-generated predicate and a number of vectors to be controlled by the to-be-generated predicate to generate control signals which cause the processing circuitry to generate a predicate data value which indicates a corresponding element size and a corresponding element count.

11. The apparatus as claimed in claim 1, wherein the decode circuitry is responsive to an all-true predicate generation instruction specifying an all-true to-be-generated predicate to generate control signals which cause the processing circuitry to generate an all-true predicate data value which indicates all-active elements for the predication indicators.

12. The apparatus as claimed in claim 1, wherein the decode circuitry is responsive to an all-false predicate generation instruction specifying an all-false to-be-generated predicate to generate control signals which cause the processing circuitry to generate an all-false predicate data value which indicates all-inactive elements for the predication indicators.

13. The apparatus as claimed in claim 1, wherein the decode circuitry is responsive to a predicate conversion instruction specifying a source predicate register holding a to-be-converted predicate data value to generate control signals which cause the processing circuitry to decode the to-be-converted predicate data value and to generate a converted predicate data value, wherein the converted predicate data value comprises a direct mask-style representation in which bit values at bit positions indicate predication of elements in a subject data item.

14. The apparatus as claimed in claim 13, wherein the predicate conversion instruction specifies more than one destination predicate register and the control signals cause the processing circuitry to generate more than one converted predicate data value, wherein each of the more than one converted predicate data values comprises the direct mask-style representation, and wherein each of the more than one converted predicate data values corresponds to a different subset of the predication indicators represented by the to-be-converted predicate data value.

15. The apparatus as claimed in claim 14, wherein the predicate conversion instruction specifies a multiplicity of the more than one converted predicate data values to be generated.

16. The apparatus as claimed in claim 13, wherein the predicate conversion instruction specifies which of multiple possible subsets of the predicate bits represented by the to-be-converted predicate data value are to be generated.

17. The apparatus as claimed in claim 1, wherein the decode circuitry is responsive to a predicate counting instruction specifying a source predicate register holding a to-be-counted predicate data value to generate control signals which cause the processing circuitry to decode the to-be-converted predicate data value to determine predication indicators indicated by the to-be-converted predicate data value and to store a scalar value corresponding to a number of active elements in the predication indicators in a destination general-purpose register.

18. The apparatus as claimed in claim 17, wherein the predicate counting instruction specifies an upper limit of the number of active elements to be counted, wherein the upper limit corresponds to one of:

two vector lengths; and four vector lengths.

19. A method of data processing comprising:

decoding instructions; and controlling processing circuitry to apply vector processing operations specified by the instructions to input data vectors, wherein the decoding comprises, in response to a vector processing instruction specifying:

a vector processing operation;

one or more source operands; and a source predicate register, generating control signals which cause the processing circuitry to perform the vector processing operation with respect to the source operand, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity consecutive identical predication indicators, each predication indicator corresponding to the element size.

20. A non-transitory computer-readable storage medium storing a computer program for controlling a host processing apparatus to provide an instruction execution environment, the computer program comprising:

decode logic to decode instructions; and processing logic to apply vector processing operations specified by the instructions to input data vectors, wherein the decode logic is responsive to a vector processing instruction specifying:

a vector processing operation;

one or more source operands; and a source predicate register, to generate control signals which cause the processing logic to perform the vector processing operation with respect to source operands, wherein the control signals further cause the processing circuitry selectively to apply the vector processing operation to elements of the one or more source operands predicated by predication indicators decoded from a predicate data value retrieved from the source predicate register, wherein the predicate data value has an encoding comprising:

an element size; and an element count indicating a multiplicity of consecutive identical predication indicators, each predication indicator corresponding to the element size.

* * * * *